United States Patent [19]

Nakanowatari

[11] Patent Number: 4,820,025
[45] Date of Patent: Apr. 11, 1989

[54] LIQUID CRYSTAL CELL
[75] Inventor: Jun Nakanowatari, Miyagi, Japan
[73] Assignee: Alps Electric Co., Ltd., Japan
[21] Appl. No.: 2,193
[22] Filed: Jan. 12, 1987
[30] Foreign Application Priority Data
Mar. 6, 1986 [JP] Japan ................................. 61-49351
[51] Int. Cl.[4] .......................... G02F 1/13; G02F 1/133
[52] U.S. Cl. ...................................... 350/334; 350/343
[58] Field of Search ................... 350/347 V, 341, 343, 350/344, 334, 346, 350 S

[56] References Cited

U.S. PATENT DOCUMENTS

| | | | |
|---|---|---|---|
| 3,787,110 | 1/1974 | Berreman et al. | 350/341 |
| 3,866,313 | 2/1975 | Yih | 350/343 |
| 4,070,749 | 1/1978 | Misono | 350/343 X |
| 4,235,525 | 11/1980 | Berman et al. | 350/339 R |
| 4,251,137 | 2/1981 | Knop et al. | 350/347 V |
| 4,264,149 | 4/1981 | Zwart et al. | 350/346 |

FOREIGN PATENT DOCUMENTS

| | | | |
|---|---|---|---|
| 2332972 | 1/1974 | Fed. Rep. of Germany | 350/343 |
| 0043724 | 3/1986 | Japan | 350/334 |

Primary Examiner—John S. Heyman
Assistant Examiner—Nap Thantu
Attorney, Agent, or Firm—Guy W. Shoup; Paul J. Winters; Stephen L. Malaska

[57] ABSTRACT

A pair of substrates are opposed to each other and the peripheral portions thereof are sealed by a sealing member. A part of the sealing member is opened so as to constitute a liquid crystal injection hole. A groove for introducing a liquid crystal is provided on the inner surface of at least one of the substrates in such a manner as to lead from the injection hole to the inner surface of the cell.

2 Claims, 3 Drawing Sheets

LIQUID CRYSTAL CELL

BACKGROUND OF THE INVENTION

1. Field of the Invention

The present invention relates to a liquid crystal cell which is used for liquid crystal display elements and the like.

2. Description of the Prior Art

A liquid crystal display element is composed of a liquid crystal cell which is fabricated by opposing a pair of substrates with oriented films and transparent electrodes provided on the inner surface thereof, interposing a spacer or the like therebetween, if necessary, sealing their peripheral portions by a sealing member, and injecting a particular liquid crystal into the liquid crystal cell, which is sealed thereafter. A voltage is applied between the transparent electrodes which are formed on the pair of substrates so as to vary the orientation of the liquid crystal at that portion, thereby displaying a letter, figure, and any given pattern.

Conventionally, what is called a vacuum injection method is used as a method of injecting a liquid crystal in a liquid crystal cell. This is a method, as shown in FIG. 6, of fabricating a liquid crystal cell by bonding the peripheral portion of a pair of substrates 1 and 2 by a sealing member 3, forming a liquid crystal injection hole 5 by opening a part of the sealing member 3, letting out the air within the cell through the injection hole 5 which is placed in a vacuum atmosphere, dipping the injection hole 5 in a tank 6 of a liquid crystal 7, and thereafter releasing the vacuum state so as to inject the liquid crystal 7 into the interior 4 of the liquid crystal cell from the injection hole 5.

However, in the above-described operation of the liquid crystal injection, the liquid crystal injection time is increased with the increasing area of the liquid cell, so that bubbles are likely to remain in the interior, which leads to decrease in the yield and, hence, increase in manufacturing cost.

Notice has recently been taken of elements using a smectic liquid crystal as liquid crystal display elements which are capable of response at such a high speed as to be used for liquid crystal TVs. Since a smectic liquid crystal has a higher viscosity and a much smaller gap between the upper and lower substrates than a conventional TN type liquid crystal, the aforementioned problems have become more vital than before.

SUMMARY OF THE INVENTION

Accordingly, it is an object of the present invention to eliminate the above-described problems in the prior art and to provide a liquid crystal cell which facilitates operation of the liquid crystal injection.

To achieve this aim, a liquid crystal cell according to the present invention is composed of a pair of opposed substrates, a sealing member for adhering the peripheral portions of the substrates to each other such that a part of the sealing member is opened for constituting a liquid crystal injection hole, and a groove for introducing a liquid crystal which is provided on the inner surface of at least one of the substrates in such a manner as to lead from the liquid crystal injection hole to the interior of the cell.

The formation of the groove leads from the injection hole to the interior of the cell, and has a certain width and depth suitable for introducing a liquid crystal under vacuum pressure quickly from the injection hole to the interior of the cell and to enter the gap between the substrates from the groove during the liquid crystal injection operation, thereby greatly reducing the liquid crystal injection time and, hence, manufacturing cost.

According to a preferred embodiment of the present invention, the groove for introducing a liquid crystal is formed inside of the sealing member so as not to interfere with a display portion. It is also necessary to provide the groove at a position where the groove does not obstruct the lead-out of the terminal of an electrode which is provided on the substrate.

According to a more preferred embodiment of the present invention, the injection hole is formed at corner portions of the substrates. When the substrates are dipped into the tank of a liquid crystal with the corner portions facing downward, the injection hole comes close to the bottom of the tank. Therefore, even if the amount of the liquid crystal which is reserved in the tank is small, the injection operation is possible, thereby enabling effective use of an expensive liquid crystal.

According to an even more preferred embodiment, the corner portions of the substrate in which the injection hole is formed are cut away at an obtuse angle, thereby enabling the injection hole to come closer to the bottom of the tank.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
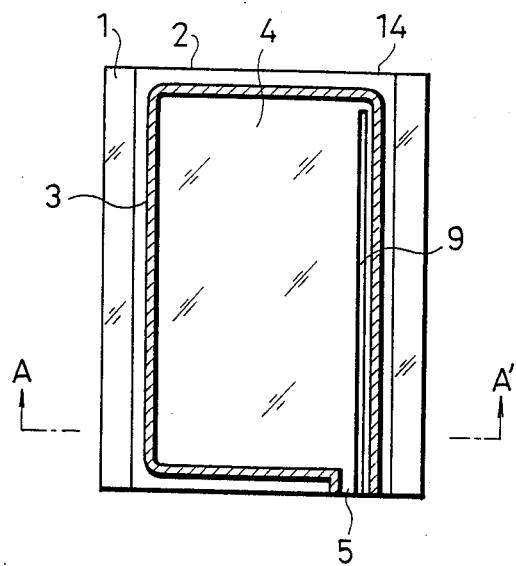
FIG. 1 is an elevational view of an embodiment of a liquid crystal cell according to the present invention.
Figure 2:
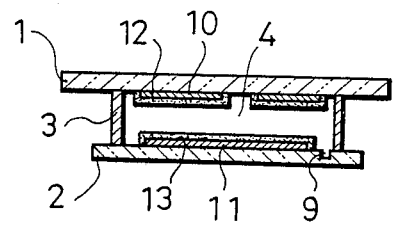
FIG. 2 is a sectional view of the embodiment shown in FIG. 1, taken along the line A–A'.

Referring first to FIGS. 1 and 2, there is shown an embodiment of a liquid crystal cell according to the present invention.

In the liquid crystal cell, one pair of glass substrates 1 and 2 are provided with transparent electrodes 10 and 11, respectively, made of an ITO film on the inner surfaces thereof by patterning, and oriented films 12 and 13 made of a polyimide resin ("PIQ": trade name, produced by Hitachi Chemical Co., Ltd.) are formed on the transparent electrodes 10 and 11, respectively, and are subjected to lapping. In the present invention, a groove 9 is provided in advance along one side of one glass substrate 2 extending inside the sealing member 3 to the interior of the electrodes. The groove 9 is formed into 300 $\mu$m in width and 200 $\mu$m in depth by cutting the substrate with a dicer ("DAD-2H/5": trade name, produced by DISCO, Ltd.)

The two glass substrates 1 and 2 are opposed to each other with the transparent electrodes 10 and 11 facing inward, pasted together with a sealing member 3 made of an epoxy resin with a spacer ("Eposter-GP25": trade name, produced by Nippon Shokubai Kagaku Kogyo Co., Ltd.)) interposed therebetween, and bonded together by heating. The sealing member 3 is provided along the peripheral portion of the juncture of the glass substrates 1 and 2, and one part of the sealing member 3 is opened to constitute the injection hole 5. One end of the groove 9 faces the injection hole 5.

Figure 6:
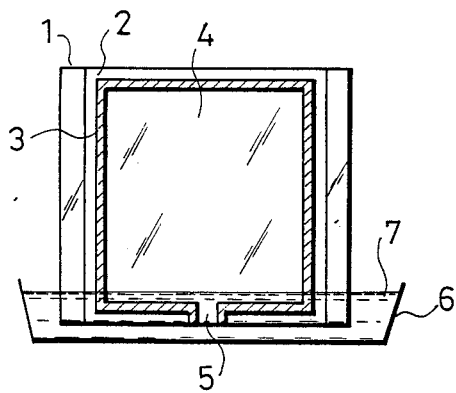
FIG. 6 is an explanatory view of a conventional liquid crystal cell in a state in which a liquid crystal is injected.

After the air is let out of the liquid crystal cell through the injection hole 5 under a vacuum, the cell is dipped in the liquid crystal tank 6 with the portion at which the injection hole 5 is formed faced downward, as in the same way as the example shown in FIG. 6. When the vacuum is released to atmospheric pressure in this state, the liquid crystal 7 begins to enter the interior 4 of the liquid crystal cell from the injection hole 5. At this time, in the liquid crystal cell of the present invention, the liquid crystal 7 first rises along the groove 9 and thereafter enters a narrow gap between the substrates 1 and 2 from the groove 9. As a result, the liquid crystal 7 is injected quickly, thereby greatly reducing the time required for the injection. The formation of the groove 9 facilitates the ingress of the liquid crystal 7 into the narrow gap between the substrates 1 and 2, thereby diminishing the chance of leaving bubbles.

Figure 3:
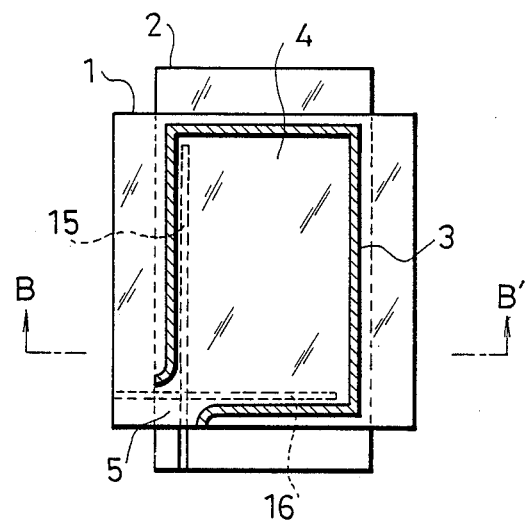
FIG. 3 is an elevational view of another embodiment of a liquid crystal cell according to the present invention.
Figure 4:
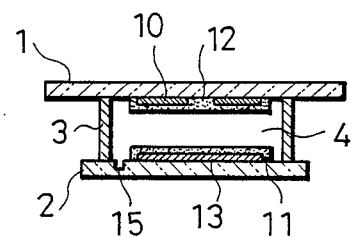
FIG. 4 is a sectional view of the embodiment shown in FIG. 3, taken along the line B–B'.
Figure 5:
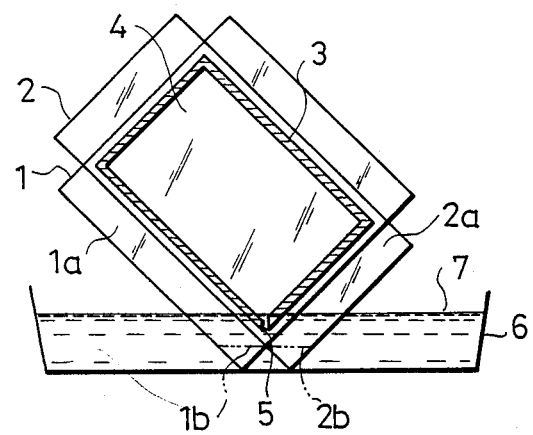
FIG. 5 is an explanatory view of the embodiment shown in FIG. 3, in a state in which a liquid crystal is injected.

Another embodiment of a liquid crystal cell according to the present invention is shown in FIGS. 3, 4, and 5.

In this embodiment, the injection hole 5 is provided at corner portions of the substrates 1 and 2. A groove 15 is provided on the inner surface of the substrate 2 in such a manner as to extend upward from the injection hole 5 inside of the sealing member 3, and a groove 16 is provided on the inner surface of the substrate 1 in such a manner as to extend from the injection hole 5 to the right-hand side in FIG. 3 inside of the sealing member 3. The liquid crystal cell has a matrix type electrode and respective terminal portions are provided at marginal portions 1a and 2a of the substrates 1 and 2, respectively. Consequently, the substrate 1 is placed on top of the substrate 2 crosswise. The other structure is the same as in the embodiment shown in Figs, 1 and 2.

After the air is let out of the liquid crystal cell through the injection hole 5 under a vacuum, the cell is dipped in the liquid crystal tank 6 with the portion at which the injection hole 5 is formed faced downward, as shown in FIG. 5. Since the injection hole 5 is formed at corner portions of the substrates 1 and 2, the injection hole 5 readily comes close to the bottom of the tank 6, so that it is possible to inject the liquid crystal even if a small amount of it is reserved in the tank 6. Furthermore, if the corner portions of the substrates 1 and 2 are cut away so as to form cutaway portions 1b and 2b, the injection hole 5 readily comes to closer to the bottom of the tank 6. When the pressure is released to atmospheric pressure in this state, the liquid crystal 7 enters the interior 4 of the liquid crystal cell. Since the grooves 15 and 16 are provided in this liquid crystal cell, the liquid crystal 7 is injected quickly, thereby reducing the time required for the injection and preventing bubbles from remaining in the interior 4 of the cell.

When the liquid crystal cell was actually produced with a cell gap of about 2 $\mu$m, and a smectic liquid crystal ("CS-1011", trade name; produced by Chisso Corporation) was injected in the above-described manner, the injection time of the liquid crystal cell of the present invention was reduced to ⅓ that of a liquid crystal cell which is not provided with the grooves 15 and 16, and no bubble remained in the interior 4 of the cell.

As described above, according to the present invention, since a groove for introducing a liquid crystal is so provided as to extend from the injection hole to the interior of the cell on the inner surface of at least one substrate so as to facilitate the ingress of the liquid crystal from the injection hole into the interior of the cell, it is possible to greatly reduce the time required for the injection operation and to prevent bubbles and the like from remaining in the interior of the cell. As a result, the liquid crystal cell of the present invention is suitable for liquid crystal display elements and the like which use a smectic liquid crystal which has a high viscosity and a small cell gap.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. In a liquid crystal cell having a pair of opposed substrates, a sealing member for sealing and joining peripheral portions of said substrates so as to form an enclosed interior space defined by said sealing member and opposed inner surfaces of said substrates, and an injection hole formed by an opening in a part of said sealing member for injecting a liquid crystal into said interior space under vacuum pressure, the improvement comprising:

a groove formed in the inner surface of one of said substrates leading from said injection hole into said interior space, which facilitates rapid injection of said liquid crystal into said interior space, wherein said groove has a width of 300 $\mu$m and a depth of 200 $\mu$m and a length extending along a corresponding length of one peripheral portion of said substrates.

2. A liquid crystal cell according to claim 1, wherein said peripheral portions of said substrates are mutually perpendicular to each other, said injection hole is formed in one corner defined by two adjacent perpendicular peripheral portions, and said groove includes two groove portions each having a length extending along a respective one of said two adjacent peripheral portions.

* * * * *